United States Patent [19]
Lee

[11] Patent Number: 6,016,292
[45] Date of Patent: Jan. 18, 2000

[54] OPTICAL PICK-UP APPARATUS

[75] Inventor: Kwang-Suk Lee, Seoul, Rep. of Korea

[73] Assignee: Daewoo Electronics Co., Ltd., Seoul, Rep. of Korea

[21] Appl. No.: 09/031,709

[22] Filed: Feb. 27, 1998

[30] Foreign Application Priority Data

Feb. 28, 1997 [KR]   Rep. of Korea ......................... 97-6528
Feb. 28, 1997 [KR]   Rep. of Korea ......................... 97-6529

[51] Int. Cl.⁷ .................................................. G11B 7/12
[52] U.S. Cl. .................................. 369/44.15; 369/44.16; 369/44.14; 359/813; 359/824
[58] Field of Search .............................. 369/44.14, 44.15, 369/44.16, 44.21, 44.22; 359/813, 814, 823, 824

[56] References Cited

U.S. PATENT DOCUMENTS

| | | | |
|---|---|---|---|
| 5,367,511 | 11/1994 | Aldenhoven et al. ................ | 369/44.14 |
| 5,523,891 | 6/1996 | Fujisawa .............................. | 369/44.15 |
| 5,524,004 | 6/1996 | Van Rosmalen ..................... | 369/44.14 |
| 5,555,228 | 9/1996 | Izuka ................................... | 369/44.15 |
| 5,657,172 | 8/1997 | Shibata et al. ...................... | 359/824 |
| 5,768,037 | 6/1998 | Marino et al. ........................ | 359/814 |

*Primary Examiner*—Thang V. Tran
*Attorney, Agent, or Firm*—Pillsbury Madison & Sutro LLP

[57] ABSTRACT

An optical pick-up apparatus for a disc player which can be manufactured in a small size with a simple construction. The apparatus has a base plate provided at one end thereof with a support plate, a permanent magnet attached to the support plate, a gel holder fixed to an upper surface of the base plate, a suspension PCB attached to a rear surface of the gel holder, a bobbin having a focusing coil and a tracking coil which are wound around the bobbin, a pair of coil PCBs which are attached to a front surface of the bobbin and to which the focusing and tracking coils are connected, an object lens holder having an object lens installed thereon and attached to front surfaces of the pair of the coil PCBs, and two pairs of suspension wires for suspending the object lens holder such that the object lens holder is movable in a focusing direction or a tracking direction. The bobbin has a horizontal H shape defined by an upper bar, a lower bar which is parallel to the upper bar, and a column provided between the upper and lower bars. The tracking and focusing coils can be precisely positioned with respect to the permanent magnet and can be easily wound around the bobbin, so the assembling work thereof is easily carried out and the operating efficiency thereof is improved.

16 Claims, 5 Drawing Sheets

OPTICAL PICK-UP APPARATUS

BACKGROUND OF THE INVENTION

1. Field of the Invention

The present invention relates to a disc player, and more particularly to an optical pick-up apparatus for a disc player which can be manufactured in a small size.

2. Prior Arts

An optical pick-up is an apparatus for recording information on an optical disc or reading the recorded information in the optical disc by using a laser beam. The optical pick-up is installed below the optical disc and linearly moves from a center of the optical disc to an outer periphery of the optical disc so as to detect a desired track position on the optical disc. By use of the optical pick-up, a beam radiated from a holographic element is introduced into a pit formed on a recording surface of the optical disc. When the beam is reflected from the optical disc, the optical pick-up detects a digital signal from the reflected beam through an optical system. The detected digital signal is converted to an analog signal by a D/A converter so that information recorded in the optical disc is reproduced.

Generally, the optical pick-up includes a light source for producing the laser beam, a beam splitter for directing the laser beam emitted from the light source toward an objective lens which focuses the laser beam on the surface of an optical disc, and a photo diode for receiving the laser beam reflected from the surface of the optical disc.

Information tracks, on which information is recorded, are concentrically or spirally formed on the recording surface of the optical disc, and the optical pick-up emits the laser beam onto the information tracks so as to record data on a predetermined position of the optical disc or to reproduce the data from the predetermined position.

In order to accurately record or reproduce the data, a focusing error control and a tracking error control should be performed. That is, the laser beam emitted onto the information track from the optical pick-up should trace the information track while the disc player is being operated. In addition, a distance between the recording surface of the optical disc and the object lens should be constantly maintained. Thus, a disc recording/reproducing apparatus detects a servo error signal including a focusing error signal and a tracking error signal by utilizing the beam reflected from the information track, and then applies electric signals to both a focusing circuit and a tracking circuit based upon the detected servo error signal, thereby moving the optical pick-up in the focusing and tracking directions.

FIG. 5 shows such a conventional optical pick-up 10. As shown in FIG. 5, conventional optical pick-up 10 includes a yoke plate 44, to which suspension support plates 46 are attached, and an objective lens holder 14 which is suspended above yoke plate 44 by means of suspensions 50 and supports an objective lens 12.

A laser beam through hole 45 is formed at the center of yoke plate 44 to allow the laser beam to pass therethrough, and a pair of inner yokes 38 and 40 and a pair of outer yokes 36 and 42 are arranged on yoke plate in opposition to each other. Inner yokes 38 and 40 are respectively surrounded by focusing coils 24 and 26. Permanent magnets 32 and 34 are respectively arranged between inner yoke 38 and outer yoke 36, and between inner yoke 40 and outer yoke 42. Also, tracking coils 28 and 30 are respectively arranged between focusing coil 24 and permanent magnet 32, and between focusing coil 26 and permanent magnet 34. Suspension support plates 46 are attached to one end of yoke plate 44, and an end plate 48 is attached to the rear surface of suspension support plates 46.

Suspensions 50 are manufactured by conductive materials, and receives an electric current from a current source (not shown) through end plate 48. One end of each suspension 50 is fixed to end plate 48 by passing through suspension support plates 46, and other end of each suspension 50 is fixed to support pieces 16 and 18 which are integrally formed with both sides of object lens holder 14.

Optical pick-up 10 constructed as described above operates as follows.

Firstly, when an optical disc, such as a CD, has been loaded in a cartridge of the disc player, optical pick-up 10 moves to a disc loading position by means of a driving device (not shown). Next, a laser beam is emitted toward a recording surface of the optical disc from a laser beam source (not shown) through object lens 12. Then, the laser beam is reflected from the recording surface and inputted into a photo detector (not shown).

Upon receiving the reflected laser beam, the photo detector detects a focusing error caused by vertical motion of the optical disc and a tracking error caused by a radial deviation of the optical disc and sends focusing and tracking error signals to a microcomputer (not shown). Then, in order to correct the focusing and tracking errors, the microcomputer sends an electric signal to both a focusing circuit and a tracking circuit so that an electric current is applied to both focusing coils 24 and 26 and tracking coils 28 and 30. When the electric current is applied to focusing coils 24 and 26, object lens holder 14 moves in a focusing direction F by means of an electromagnetic-interaction generated between permanent magnets 32 and 34 and focusing coils 24 and 26, thereby correcting the focusing error.

In addition, when the electric current is applied to tracking coils 28 and 30, object lens holder 14 moves in a tracking direction F by an electromagnetic-interaction between permanent magnets 32 and 34 and tracking coils 28 and 30, thereby correcting the tracking error.

However, in order to accurately move lens holder 14 in the focusing or tracking direction, the tracking and focusing coils should be precisely positioned at their operating positions with respect to permanent magnets 32 and 34. Though focusing coils 24 and 26 can be precisely wound around lens holder 14 with respect to permanent magnets 32 and 34, it is difficult to precisely install tracking coils 28 and 30 at their operating position with respect to permanent magnets 32 and 34.

For this reason, the manufacturer should correct the positions of tracking coils 28 and 30 so as to obtain precise positions with respect to permanent magnets 32 and 34 under the condition that tracking coils 24 and 26 are temporarily fixed to focusing coils 24 and 26. Accordingly, assembling tracking coils 28 and 30 into focusing coils 24 and 26 is very complicated, so the productivity of pick-up 10 is decreased.

In addition, when the electric current is applied thereto, tracking coils 28 and 30 adhered to focusing coils 24 and 26 make electromagnetic-interaction in relation to permanent magnets 32 and 34 so as to move lens holder 14 in the tracking direction. However, since the side surfaces of tracking coils 28 and 30, which face each other, can make the electromagnetic-interaction only with respect to permanent magnets 32 and 34, the operating efficiency thereof is reduced.

Furthermore, the pair of outer yokes 36 and 42 for fixing permanent magnets 32 and 34 thereto, the pair of inner yokes 38 and 40 for forming a magnetic closed circuit, and suspension support plate 46 for fixing end plate 48 thereto are provided in yoke plate 44 by bending work. This kind of bending work needs to be carried out accurately, so the working efficiency is decreased.

In addition, the conventional optical pick-up apparatus requires the pair of inner yokes 38 and 40, the pair of outer yokes 36 and 42, the pair of focusing coils 24 and 26, two pairs of tracking coils 28 and 30, and the pair of permanent magnets 32 and 34, so yoke plate 44 on which the above elements are installed should be designed in a relatively large size. Accordingly, not only are many assembling steps required, but also it is difficult to make the optical pick-up apparatus in a small size.

SUMMARY OF THE INVENTION

The present invention has been made to overcome the above described problem of the prior art, and accordingly it is an object of the present invention to provide an optical pick-up apparatus having a simple construction which can be manufactured in a small size and in which a focusing coil and a tracking coil can be simply installed in the optical pick-up apparatus.

To achieve the above-described object, the present invention provides an optical pick-up apparatus comprising:

a base plate provided at one end thereof with a support plate which protrudes upward;

a permanent magnet attached to a front surface of the support plate;

a gel holder fixed to an upper surface of the base plate;

a suspension PCB attached to a rear surface of the gel holder;

a bobbin installed in a front of the permanent magnet by a predetermined distance apart from the permanent magnet;

a focusing coil and a tracking coil which are wound around the bobbin perpendicularly to each other;

a pair of coil PCBs which are attached to a front surface of the bobbin and to which the focusing and tracking coils are connected;

an object lens holder having an object lens installed thereon, the object lens holder being attached to front surfaces of the pair of the coil PCBs; and two pairs of suspension wires for suspending the object lens holder in such a manner that the object lens holder is movable in a focusing direction or a tracking direction, each pair of suspension wires extending from the suspension PCB and being respectively connected to rear surfaces of the pair of the coil PCBs through the gel holder.

According to a preferred embodiment of the present invention, the bobbin has a horizontal H shape defined by an upper bar, a lower bar which is parallel to the upper bar, and a column provided between the upper and lower bars. The focusing coil is wound around the column and the tracking coil is wound around the upper and lower bars.

An upper neck portion having a width smaller than a width of the upper bar is provided at a center of the upper bar, and a lower neck portion having a width smaller than a width of the lower bar is provided at a center of the lower bar. The tracking coil is wound around the upper and lower neck portions.

The pick-up apparatus having the construction mentioned above is operated as follows.

The laser beam emitted from a holographic element is directed into the object lens through a mirror section. The laser beam directed into the object lens is converged onto the recording surface of a disc through the object lens and is reflected from the recording surface of the disc. Then, the reflected beam is inputted into the photo detector in the holographic element through the object lens. The photo detector detects tracking and focusing errors based on the reflected beam and sends tracking and focusing error signals to a microcomputer. Upon receiving the tracking and focusing error signals, the microcomputer sends a current supply signal to the current source so that the current is applied to the tracking and focusing coils from the current source.

When the current is applied to the tracking/focusing coil, Lorentz force is generated between tracking/focusing coil and the permanent magnet, so the tracking/focusing coil moves in the tracking/focusing direction. Accordingly, the object lens holder coupled to the bobbin moves in the tracking direction so as to arrange the object lens in an accurate tracking/focusing position, thereby correcting the tracking/focusing error caused by a radial deviation of the disc.

The focusing control and tracking control are continuously carried out while the optical pick-up apparatus is being operated so as to precisely record/reproduce information onto/from the disc.

As described above, according to the optical pick-up apparatus of the present invention, the tracking and focusing coils can be precisely positioned with respect to the permanent magnet and can be easily wound around the bobbin, so the assembling work thereof is easily carried out.

In addition, the tracking coil widely makes electromagnetic-interaction in relation to the permanent magnet, so the operating efficiency thereof is improved.

Furthermore, since there is no need to install numerous elements on the base plate, such as outer yokes and inner yokes, the base plate has simple construction.

Since the base plate can be manufactured in a small size, the optical pick-up apparatus can also be manufactured in a small size.

BRIEF DESCRIPTION OF THE DRAWINGS

The above object and other advantages of the present invention will become more apparent by describing in detail preferred embodiment thereof with reference to the attached drawings in which.

DESCRIPTION OF THE PREFERRED EMBODIMENTS

Hereinbelow, a preferred embodiment of the present invention will be described in detail with reference to the accompanying drawings.

Figure 1:
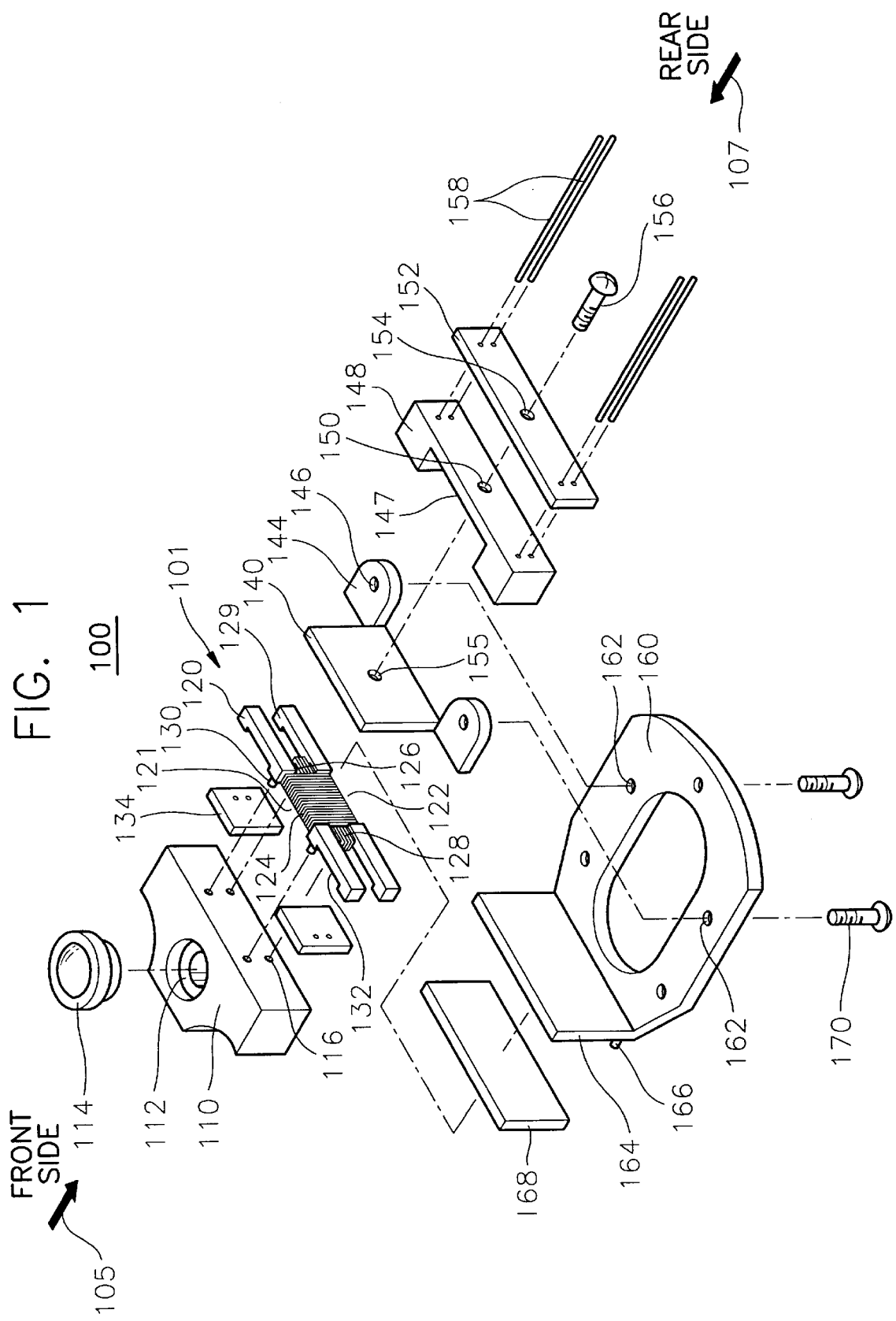
FIG. 1 is an exploded perspective view of an optical pick-up apparatus according to the first embodiment of the present invention.
Figure 2:
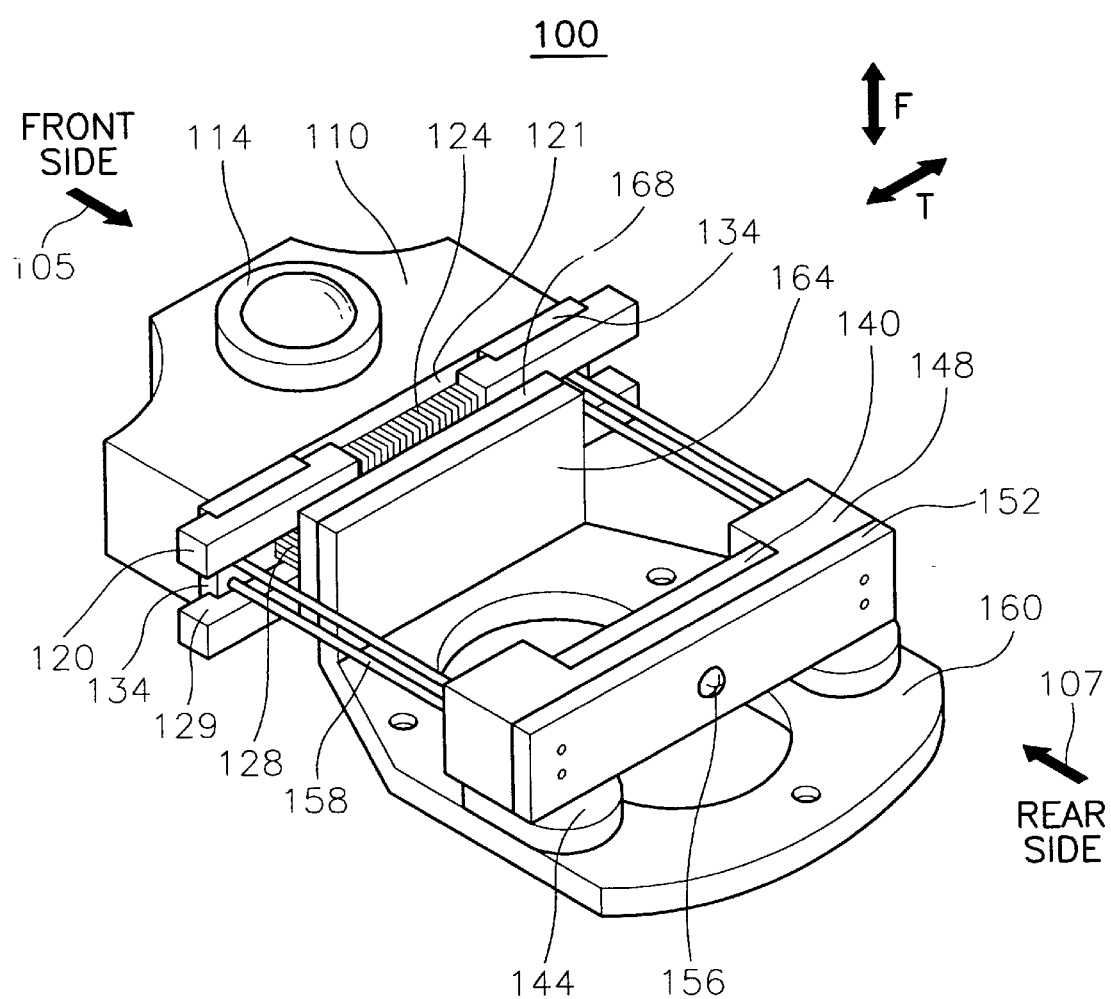
FIG. 2 is an assembled perspective view of an optical pick-up apparatus according to the first embodiment of the present invention.

FIGS. 1 and 2 show an optical pick-up apparatus 100 according to the first embodiment of the present invention.

As shown in FIGS. 1 and 2, optical pick-up apparatus 100 has a base plate 160 provided at one end thereof with a support plate 164 which is upwardly protruded therefrom. A permanent magnet 168 is attached to the front surface of support plate 164. In this application, the front surface or the front side means a position corresponding to a front side of optical pick-up apparatus 100 as shown in FIGS. 1 and 2 by arrow 105, and the rear surface or the rear side means a position corresponding to a rear side of optical pick-up apparatus 100 as shown in FIGS. 1 and 2 by arrow 107.

A gel holder 148 filled with a damping gel for reducing a vibration is fixed to an upper surface of base plate 160 and a suspension PCB 152 is attached to a rear surface of gel holder 148. A bobbin 101, around which a focusing coil 128 and a tracking coil 124 are wound perpendicular to each other, is installed in a front of permanent magnet 168 by a predetermined distance apart from permanent magnet 168. At a front surface of bobbin 101, there are attached a pair of coil PCBs 134 to which focusing and tracking coils 128 and 124 are connected.

Attached to the front surfaces of the pair of coil PCBs 134 is an object lens holder 110 having an object lens 114 installed thereon. Object lens 114 is formed at the upper surface thereof with a lens seat 112 into which object lens 114 is placed. In addition, two pairs of suspension wires 158, for suspending object lens holder 110 in such a manner that object lens holder 110 is movable in a focusing direction F or a tracking direction T, are extending from suspension PCB 152 and are, respectively, connected to the rear surfaces of the pair of coil PCBs 134 through gel holder 148.

Gel holder 148 is formed at a front surface thereof with a rectangular groove 147 into which a support member 140 is rested. Support member 140 is formed at a center portion thereof with a screw hole 155. In addition, gel holder 148 and suspension PCB 152 are formed at center portions thereof with first and second perforations 150 and 154, respectively. A first screw 156 is screw-coupled into screw hole 155 of support member 140 through first and second perforations 150 and 154 so that gel holder 148 and suspension PCB 152 is fixedly supported on base plate 160.

In addition, support member 140 is provided at a lower portion thereof with a pair of fixing plates 144. Each fixing plate 144 has a screw hole 146. A pair of second screws 170 are screw-coupled into screw holes 146 through a pair of third perforations 162, so that support 140 is fixed to the upper surface of base plate 160.

A pair of protrusions 166 are integrally provided at a front lower portion of support plate 164. Permanent magnet 168 is adhered to the front surface of support plate 164 by means of an ultraviolet bond while it is being supported on protrusions 166.

Bobbin 101 is integrally provided at the front surface thereof with at least one coupling pin 130, and object lens holder 110 is formed at a rear surface thereof with at least one coupling hole 116 into which coupling pin 130 is inserted. In addition, bobbin 101 is formed at the front surface thereof with a pair of grooves 132 into which the pair of coil PCBs 134 are partially inserted. The pair of coil PCBs 134 are adhered to grooves 132 of bobbin 101 by means of an ultraviolet bond. In addition, object lens holder 110 is also adhered to the front surface of coil PCBs 134 by means of an ultraviolet bond. Accordingly, when object lens holder 110 is attached to coil PCBs 134, bobbin 101 is spaced by a predetermined distance apart from object lens holder 110 by coil PCBs 134 so that tracking and focusing coils 124 and 128 wound around bobbin 101 cannot make contact with the rear surface of object lens holder 110.

Bobbin 101 has a horizontal H shape defined by an upper bar 120, a lower bar 129 which is parallel to upper bar 120, and a column 126 provided between upper and lower bars 120 and 129. Focusing coil 128 is wound around column 126 and tracking coil 124 is wound around upper and lower bars 120 and 129.

In order to allow tracking coil 124 to be easily wound around upper and lower bars 120 and 129, an upper neck portion 121 having a width smaller than a width of upper bar 120 is provided at a center of upper bar 120, and a lower neck portion 122 having a width smaller than a width of lower bar 129 is provided at a center of lower bar 129. Tracking coil 124 is wound around upper and lower neck portions 121 and 122. Accordingly, tracking and focusing coils 124 and 128 can be precisely positioned with respect to permanent magnet 168. By this arrangement, the rear surface of tracking coil 124 which makes electromagnetic-interaction with respect to permanent magnet 168 can be widely formed, so the operating efficiency thereof is improved.

The pick-up apparatus having the construction mentioned above is operated as follows.

Firstly, the laser beam emitted from a holographic element (not shown) is directed into object lens 114 through a mirror section (not shown). The laser beam directed into object lens 114 is converged onto the recording surface of a disc through object lens 114 and is reflected from the recording surface of the disc. Then, the reflected beam is inputted into the photo detector in the holographic element through object lens 114. The photo detector detects tracking and focusing errors based on the reflected beam and sends tracking and focusing error signals to a microcomputer (not shown). Upon receiving the tracking and focusing error signals, the microcomputer sends a current supply signal to the current source so that the current is applied to tracking and focusing coils 124 and 128 from the current source.

When the current is applied to tracking coil 124, Lorentz force is generated between tracking coils 124 and permanent magnet 168, so the tracking coil moves in tracking direction T. Accordingly, object lens holder 110 coupled to bobbin 101 moves in tracking direction T so as to arrange object lens 114 in an accurate track position, thereby correcting the tracking error caused by a radial deviation of the disc.

At the same time, when the current is applied to focusing coil 128, Lorentz force is generated between focusing coil 128 and permanent magnet 168, so object lens holder 110 moves in focusing direction F. Accordingly, object lens 114 mounted on the upper surface of object lens holder 110 moves in focusing direction F, thereby correcting the focusing error caused by a vertical motion of the disc.

The focusing control and tracking control are continuously carried out while the optical pick-up apparatus is being operated so as to precisely record/reproduce information onto/from the disc.

As described above, according to the optical pick-up apparatus of the present invention, the tracking and focusing coils can be precisely positioned with respect to the permanent magnet and can be easily wound around the bobbin, so the assembling work thereof is easily carried out.

In addition, the tracking coil widely makes electromagnetic-interaction in relation to the permanent magnet, so the operating efficiency thereof is improved.

Furthermore, since there is no need to install numerous elements on the base plate, such as outer yokes and inner yokes, the base plate has a simple construction.

Since the base plate can be manufactured in a small size, the optical pick-up apparatus can also be manufactured in a small size.

Figure 3:
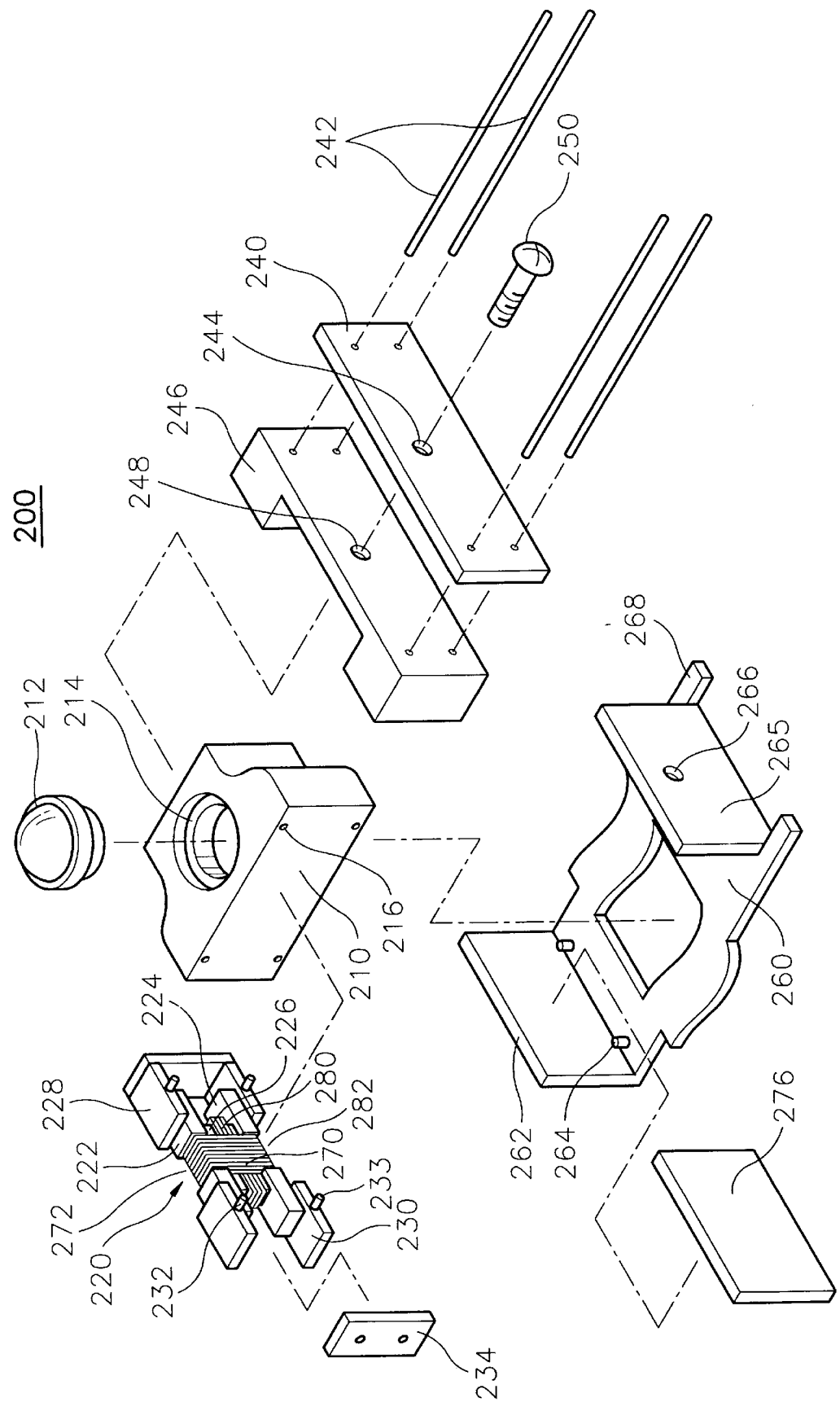
FIG. 3 is an exploded perspective view of an optical pick-up apparatus according to the second embodiment of the present invention.
Figure 4:
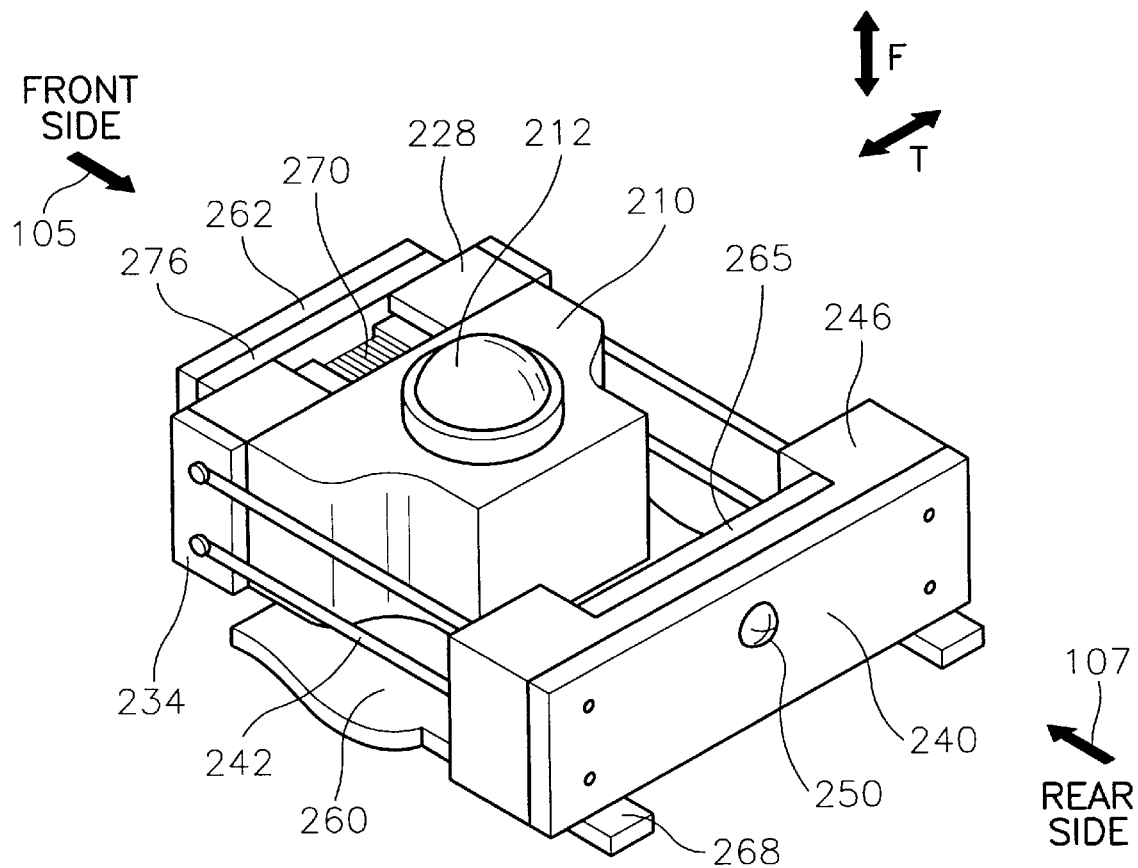
FIG. 4 is an assembled perspective view of an optical pick-up apparatus according to the second embodiment of the present invention.
Figure 5:
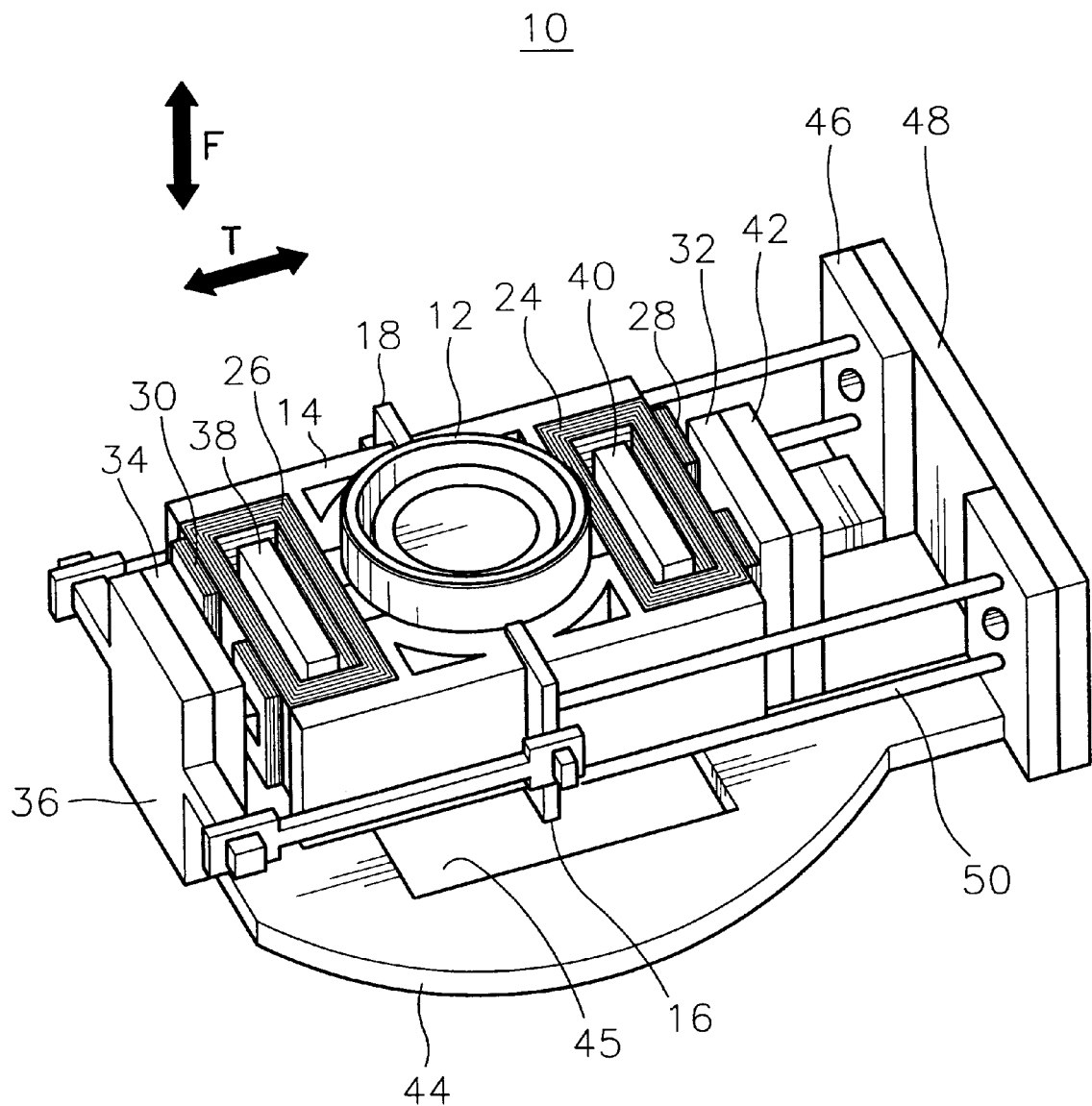
FIG. 5 is a perspective view of a conventional optical pick-up apparatus.

On the other hand, FIGS. 3 and 4 show an optical pick-up apparatus 200 according to the second embodiment of the present invention.

As shown in the figures, optical pick-up apparatus 200 according to the second embodiment of the present invention has a base plate 260 provided at a first end thereof with a first support plate 262 which is upwardly protruded and a second end thereof with a second support plate 265 which is upwardly protruded. First and second support plates 262 and 265 are formed by bending both ends of base plate 260. When second support plate 265 is bent, a pair of support pieces 268 are formed at a rear end of base plate 260.

A permanent magnet 276 is attached to a rear surface of first support plate 262, and a gel holder 246 filled with a damping gel is attached to a rear surface of second support plate 246. A suspension PCB 240 is attached to a rear surface of gel holder 246. A bobbin 220 having a focusing coil 280 and a tracking coil 270 which are wound around bobbin 220 in perpendicular to each other is installed adjacent to a rear surface of permanent magnet 276.

At both sides of bobbin 220, there are attached a pair of coil PCBs 234 to which focusing and tracking coils 280 and 270 are connected. Coil PCBs 234 are adhered to bobbin 220 by means of an ultraviolet bond. An object lens holder 210 having an object lens 212 installed thereon is attached to a rear surface of bobbin 220. In addition, two pairs of suspension wires 242, for suspending object lens holder 210 in such a manner that object lens holder 210 is movable in the focusing or tracking direction, are extended from suspension PCB 240 and are connected to side walls of the pair of coil PCBs 234 through gel holder 246.

Gel holder 246 is formed at a front surface thereof with a rectangular groove 247 into which second support plate 265 is rested. Suspension PCB 240 and gel holder 246 are formed at their upper portions with first and second perforations 244 and 248. A screw 250 is screw-coupled into a screw hole 266 formed at an upper portion of second support plate 265 through first and second perforations 244 and 248 so that suspension PCB 240 and gel holder 246 can be fixed to second support plate 265.

A pair of protrusions 264 are integrally provided at an upper surface of base plate 260 adjacent to first support plate 262. Permanent magnet 276 is adhered to the rear surface of first support plate 262 by means of an ultraviolet bond while it is being supported by protrusions 264.

Bobbin 220 has a horizontal H shape defined by an upper bar 222, a lower bar 224 which is parallel to upper bar 222, and a column 226 provided between upper and lower bars 222 and 224. Focusing coil 280 is wound around column 226, and tracking coil 270 is wound around upper and lower bars 222 and 224.

In addition, a pair of upper panels 228 having a width larger than a width of upper bar 222 are integrally provided on an upper surface of upper bar 222 in opposite to each other, and a pair of lower panels 230 having a width larger than a width of lower bar 224 are integrally provided on an underside of lower bar 224 in opposite to each other. Tracking and focusing coils 270 and 280 do not make contact with permanent magnet 276 because of upper and lower panels 228 and 230.

Upper coupling pins 232 are provided at each rear surface of upper panels 228, and lower coupling pins 233 are provided at each rear surface of lower panels 230. Object lens holder 210 is formed at a front surface thereof with a plurality of coupling holes 216 into which upper and lower coupling pins 232 and 233 are inserted.

In order to allow tracking coil 270 to be easily wound around upper and lower bars 222 and 224, an upper neck portion 272 having a width smaller than a width of upper bar 222 is provided at a center of upper bar 222, and a lower neck portion 282 having a width smaller than a width of lower bar 224 is provided at a center of lower bar 224. Tracking coil 270 is wound around upper and lower neck portions 272 and 282.

Accordingly, similar to the first embodiment of the present invention, tracking and focusing coils 270 and 280 according to the second embodiment of the present invention can be precisely positioned with respect to permanent magnet 276.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. An optical pick-up apparatus comprising:
a base plate provided at one end thereof with a support plate which is upwardly protruded;
a permanent magnet attached to a front surface of the support plate;
a gel holder fixed to an upper surface of the base plate;
a suspension PCB attached to a rear surface of the gel holder;
a bobbin installed in a front of the permanent magnet by a predetermined distance apart from the permanent magnet;
a focusing coil and a tracking coil which are wound around the bobbin in perpendicular to each other;
a pair of coil PCBs which are attached to a front surface of the bobbin and to which the focusing and tracking coils are connected;
an object lens holder having an object lens installed thereon, the object lens holder being attached to front surfaces of the pair of the coil PCBs; and
two pairs of suspension wires for suspending the object lens holder in such a manner that the object lens holder is movable in a focusing direction or a tracking direction, each pair of suspension wires extending from the suspension PCB and being respectively connected to rear surfaces of the pair of the coil PCBs through the gel holder.

2. The optical pick-up apparatus as claimed in claim 1, wherein the gel holder is formed on a front surface thereof with a rectangular groove into which a support member is rested, the suspension PCB and the gel holder being screw-coupled to the support member by means of a first screw.

3. The optical pick-up apparatus as claimed in claim 2, wherein the support member is provided at a lower portion thereof with a pair of fixing plates, the fixing plates being provided at both sides of the support member and being fixed to the upper surface of the base plate by means of a second screw.

4. The optical pick-up apparatus as claimed in claim 1, wherein a pair of protrusions are integrally provided at a front lower portion of the support plate, the permanent magnet being installed on the protrusions and being adhered to the front surface of the support plate by means of an ultraviolet bond.

5. The optical pick-up apparatus as claimed in claim 1, wherein the bobbin is integrally provided at the front surface thereof with at least one coupling pin, the object lens holder being formed at a rear surface thereof with at least one coupling hole into which the coupling pin is inserted.

6. The optical pick-up apparatus as claimed in claim 5, wherein the bobbin is formed at the front surface thereof with a pair of grooves into which the pair of coil PCBs are partially inserted, the bobbin being spaced by a predetermined distance apart from the object lens holder by the coil PCBs when the bobbin is assembled to the object lens holder.

7. The optical pick-up apparatus as claimed in claim 6, wherein the pair of coil PCBs are adhered to the pair of grooves by means of an ultraviolet bond.

8. The optical pick-up apparatus as claimed in claim 6, wherein the bobbin has a horizontal H shape defined by an upper bar, a lower bar which is parallel to the upper bar, and a column provided between the upper and lower bars, the focusing coil being wound around the column, the tracking coil being wound around the upper and lower bars.

9. The optical pick-up apparatus as claimed in claim 8, wherein an upper neck portion having a width smaller than a width of the upper bar is provided at a center of the upper bar, and a lower neck portion having a width smaller than a width of the lower bar is provided at a center of the lower bar, the tracking coil being wound around the upper and lower neck portions.

10. An optical pick-up apparatus comprising:

a base plate provided at a first end thereof with a first support plate which is upwardly protruded and a second end thereof with a second support plate which is upwardly protruded;

a permanent magnet attached to a rear surface of the first support plate;

a gel holder attached to a rear surface of the second support plate;

a suspension PCB attached to a rear surface of the gel holder;

a bobbin installed adjacent to a rear surface of the permanent magnet;

a focusing coil and a tracking coil which are wound around the bobbin in perpendicular to each other;

a pair of coil PCBs which are attached to both sides of the bobbin and to which the focusing and tracking coils are connected;

an object lens holder having an object lens installed thereon, the object lens holder being attached to a rear surface of the bobbin; and two pairs of suspension wires for suspending the object lens holder in such a manner that the object lens holder is movable in a focusing direction or a tracking direction, each pair of suspension wires extending from the suspension PCB and being respectively connected to side walls of the pair of the coil PCBs.

11. The optical pick-up apparatus as claimed in claim 10, wherein the gel holder is formed at a front surface thereof with a rectangular groove into which the second support plate is rested, the suspension PCB and the gel holder being screw-coupled to the second support plate by means of a screw.

12. The optical pick-up apparatus as claimed in claim 10, wherein a pair of protrusions are integrally provided at an upper surface of the base plate adjacent to the first support plate, the permanent magnet being installed on the protrusions and being adhered to the rear surface of the first support plate by means of an ultraviolet bond.

13. The optical pick-up apparatus as claimed in claim 10, wherein the bobbin has a horizontal H shape defined by an upper bar, a lower bar which is parallel to the upper bar, and a column provided between the upper and lower bars, the focusing coil being wound around the column, the tracking coil being wound around the upper and lower bars.

14. The optical pick-up apparatus as claimed in claim 13, wherein a pair of upper panels having a width lager than a width of the upper bar are integrally provided on an upper surface of the upper bar in opposite to each other, and a pair of lower panels having a width larger than a width of the lower bar are integrally provided on an underside of the lower bar in opposite to each other, the tracking and focusing coils being spaced by a predetermined distance apart from the permanent magnet by the upper and lower panels.

15. The optical pick-up apparatus as claimed in claim 14, wherein a coupling pin is provided at each rear surface of upper and lower panels, and the object lens holder is formed at a front surface thereof with a plurality of coupling holes into which the coupling pin is inserted.

16. The optical pick-up apparatus as claimed in claim 14, wherein an upper neck portion is provided at a center of the upper bar, and a lower neck portion is provided at a center of the lower bar, the tracking coil being wound around the upper and lower neck portions.

* * * * *